Patented Apr. 10, 1934

1,954,055

UNITED STATES PATENT OFFICE 1,954,055

COMPOSITE GLASS AND PROCESS OF MAKING IT

Maurice L. Macht, North Arlington, N. J., assignor to Duplate Corporation, a corporation of Delaware No Drawing. Application January 15, 1931, Serial No. 509,037

7 Claims. (Cl. 49—81)

This invention relates to the manufacture of the so-called composite, laminated or safety glass which consists essentially of a strengthening layer of cellulose ester plastic firmly cemented between two plates of glass, or multiples of this structure, and more particularly to an improvement in laminating procedure which results in a product which is much more resistant to the ill effects of weathering than is ordinarily obtained, particularly when solvents, plasticizers, resins, or cellulose ester plasticizer compositions are used as an adhesive between the strengthening layer and its attached glass plates.

In the past little or no attention has been paid to the moisture present in or on the plastic layer, except where gelatin adhesives, or other water soluble adhesives, are used and in such cases it has been thought well to have the plastic layer slightly moist either by storing it in a controlled atmosphere or by soaking in water. In general, adhesion obtained through the use of solvents, plasticizers, resins, cellulose ester cements or mixtures of all four has not been as good as might be desired, particularly from a standpoint of resistance to weathering. It is an object of this invention to improve the resistance to weathering of glasses composited by means of cements of this type.

Briefly stated, the object is accomplished by introducing a drying operation in the lamination procedure. I have found that if the strengthening layer is dried prior to the laminating of the product, a remarkable improvement in resistance to weathering results. Any of the known pyroxylin resin, or solvent cements, such as those mentioned in my application, Serial No. 484,468, may be applied to the glass plates by any of the known methods, but prior to the assembly of the samples the plastic layer should be dried. 1 have found a temperature of 100 degrees F. for a period of two hours to work quite satisfactorily, however, I do not wish to limit myself to this one method of drying for I have found that this period may be varied over wide limits or the drying may be accomplished by the use of a higher temperature and shorter periods or by drying at room temperature with dry air. Storage in a closed compartment over anhydrous calcium chloride or other dehydrating agents also has the desired effect. After drying, the plastic layer is then inserted between the previously adhesive coated plates and the whole pressed in the usual manner.

It is not entirely clear whether the moisture removed from the plastic layer is merely normal surface moisture, or if it is the moisture absorbed by the plastic from the air, after the normal seasoning, however, I have found that this moisture, whether absorbed or adsorbed is responsible for the difference between a well adhered and a poorly adhered lamination.

As illustrative of the particular cementing materials with which the process is applicable, the following resins may be mentioned: Canada balsam, glyptal resins, and vinyl resins, such resins being dissolved in suitable solvents; such as cellosolve acetate, ethyl lactale droxan, diacetone alcohol, butyl acetate, amylacetate, ethyl acetate or toluol. When solvents of the plastic are used instead of the resins either carrying pyroxylin in solution or without it, a wide range of such solvents is available; such as acetone, ethyl acetate, diacetone alcohol, diethylene glycol, methyl cellosolve, tricryse phosphate, dibutyl phthalate, dimethyl phthalate, amyl acetate or mixtures of these solvents, either with or without dilutents, such as toluol, xylol, petroleum spirits, or solvent naphtha.

What I claim is:

1. A process of securing together sheets of glass and cellulose ester plastic with cementing material which is non-water soluble which consists in drying the plastic to drive off moisture, applying the cementing material between the sheets and pressing them together.

2. A process of securing together sheets of glass and cellulose ester plastic with resinous cementing material which consists in drying the plastic to drive off moisture, applying the cementing material between the sheets and pressing them together.

3. A process of securing together sheets of glass and cellulose ester plastic with plastic solvent fluid as an adhesive, which consists in drying the plastic to drive off moisture, applying said material between the sheets and pressing them together.

4. A laminated plate comprising sheets of glass and an interposed sheet of dried cellulose ester plastic secured together by a non-water soluble cement.

5. A laminated plate comprising sheets of glass and an interposed sheet of dried cellulose ester plastic secured together by a cement of the resin type.

6. A laminated plate comprising sheets of glass and an interposed sheet of dried cellulose ester plastic secured together by a cellulose ester plastic adhesive.

7. A process of securing together sheets of glass and cellulose ester plastic with a cellulose ester plastic adhesive, which consists in drying the plastic to drive off moisture, applying the adhesive in the form of a solution to the glass plates inserting the dried plastic between the glass sheets and pressing the sheets which are thus assembled.

MAURICE L. MACHT.